United States Patent [19]

Pullukat et al.

[11] Patent Number: 5,006,619

[45] Date of Patent: Apr. 9, 1991

[54] POLYMERIZATION CATALYST AND METHOD

[75] Inventors: Thomas J. Pullukat, Hoffman Estates; Raymond E. Hoff, Palatine, both of Ill.

[73] Assignee: Quantum Chemical Corporation, Cincinnati, Ohio

[21] Appl. No.: 583,482

[22] Filed: Feb. 27, 1984

[51] Int. Cl.$^5$ .................. C08F 4/658; C08F 10/00
[52] U.S. Cl. ................... 526/128; 526/123; 526/352
[58] Field of Search ................ 526/128, 129

[56] References Cited

U.S. PATENT DOCUMENTS

| | | | |
|---|---|---|---|
| 3,787,384 | 1/1974 | Stevens et al. | 526/129 |
| 4,115,319 | 9/1978 | Scata et al. | 526/142 |
| 4,258,159 | 3/1981 | Bienfait | 526/114 |
| 4,301,029 | 11/1981 | Caunt et al. | 526/128 |
| 4,468,477 | 8/1984 | Caunt et al. | 526/128 |
| 4,565,795 | 1/1986 | Short et al. | 526/129 |

FOREIGN PATENT DOCUMENTS

| | | |
|---|---|---|
| 2621591 | 11/1976 | Fed. Rep. of Germany . |
| 2543219 | 4/1977 | Fed. Rep. of Germany ...... 526/124 |
| 2390456 | 12/1978 | France . |

*Primary Examiner*—Edward J. Smith
*Attorney, Agent, or Firm*—Marshall, O'Toole, Gerstein, Murray & Bicknell

[57] ABSTRACT

A catalyst and method in which the catalyst is used in association with an aluminum cocatalyst in the polymerization and copolymerization of 1-olefins. The catalyst is prepared by reacting certain multifunctional organic silicon compounds (silanes) with silica, alumina or the like having surface hydroxyl groups, or a mixture thereof, in which the silicon compound reacts with these surface hydroxyl groups, followed by reacting the product of this with a halide or alkoxide of a Group IVB or VB transition metal such as titanium, vanadium, zirconium or mixtures of these and finally reacting this product with a Group IIA organometallic compound or compound such as magnesium and calcium. The Group IIA organometallic compound can also be added before these transition metal compounds.

30 Claims, No Drawings

POLYMERIZATION CATALYST AND METHOD

CROSS-REFERENCE TO RELATED APPLICATIONS

This is a continuation of copending, commonly assigned U.S. application Ser. No. 06/414,970 filed Sept. 7, 1982, now abandoned, which is a division of copending, commonly assigned U.S. application Ser. No. 06/270,410 filed June 4, 1981, now U.S. Pat. No. 4,530,912 issued July 23, 1985.

BACKGROUND OF THE INVENTION

In this invention, the polymerization catalysts useful in polymerizing and copolymerizing 1-olefins are prepared by the reaction of silica or alumina with a multifunctional silane compound, a titanium, vanadium, zirconium or mixture compound and a Group IIA organometallic compound such as an organomagnesium compound. These catalysts are then activated, associating them with an organoaluminum cocatalyst. These catalyst products are primarily useful for the polymerization of 1-olefins such as ethylene and copolymerization of these 1-olefins.

One of the features of this invention is to produce improved plastic resins by the use of these catalysts. The characteristics of the polymers and copolymers produced can be controlled by the selection of the silane compounds and their amounts relative to the other reactants.

Another feature of the invention is the method of polymerizing with these catalysts in the particle form, gas phase and solution form polymerization processes.

K. Ziegler first discovered two component catalysts based on compounds of the Group IVB-VIB metals of the periodic table and an organometallic compound belonging to Groups I-IIIA of the periodic table for the polymerization of olefins. Since his discovery, numerous catalysts have been disclosed as improvements over the original Ziegler catalysts. Most of these catalyst systems are of relatively low activity and stability. They require a costly catalyst removal step.

One of the modifications attempted in an effort to increase the activity of the Ziegler type catalyst was to deposit the catalyst components on an inert support. In U.S. Pat. No. 2,981,725 such a process is disclosed. The supports used were magnesium chloride, silicon carbide, silica gel, calcium chloride, etc. The activity of the catalysts disclosed in this patent was still low.

Recently several catalyst systems have been disclosed in which titanium or vanadium halides are reacted with magnesium containing supports such as magnesium alkoxide, magnesium hydroxy chloride, etc. U.S. Pat. No. 3,654,249; 3,759,884; 4,039,472; 4,082,692 and 4,097,409 describe such catalysts. In catalysts that contain silica, a thermal activation of silica prior to deposition of the catalyst components is necessary.

None of these patents disclose the methods and products of this invention.

SUMMARY OF THE INVENTION

This invention provides novel catalysts, methods of making them and methods of polymerizing and copolymerizing 1-olefins. These catalysts are especially useful for the polymerization of ethylene to high density polyethylene, and for the copolymerization of ethylene with 1-olefins for the formation of medium and low density copolymers. These improved catalysts are highly active and are well suited for the economical and energy efficient particle form and gas phase processes. Specifically, the object of this invention is to improve the well known Ziegler type catalyst by the method of this invention. These improved catalysts can be easily adapted to the particle form or gas phase process plants. Polymers made using the invention catalysts can have high MI and narrow molecular weight distribution. Thus, polymers well suited for injection molding and rotational molding applications can be manufactured. The catalysts of this invention are stable, particulate, and easy flowing.

DESCRIPTION OF THE PREFERRED EMBODIMENTS

The catalysts of this invention have higher reactivity in olefin polymerization than normal Ziegler catalysts. The reaction of the multifunctional organic silicon compounds (silanes) with silica or alumina is the critical step. Since the silica does not need to be thermally activated at high temperatures, the cost of the fuel used for heating and the cost of the furnace or other equipment can be avoided. Furthermore, the losses of material which are frequently encountered in operations such as heating in a fluidized bed can also be avoided. The catalysts described by this invention are suitable for economic gas phase or particle form processes. The polymers made by this catalyst do not need a post reaction step to remove the catalyst residues. In a particle form process, the polymers are particulate in nature and do not show fouling tendencies compared to prior art catalysts.

In copending application Ser. No. 112,560 filed Jan. 16, 1980 (now U.S. Pat. No. 4,530,913 issued July 23, 1985) assigned to the same assignee as the present application, there are disclosed catalysts and methods in which the silica or alumina is reacted with a monofunctional organic silicon compound. Such monofunctional organic silicon compounds have only one reactive group bonded to each silicon atom in the molecule. When they react with silica or alumina, the reactive group is consumed. The silane portion, bonded to the surface of the silica as a result of the reaction, has remaining with it only three relatively unreactive silicon-alkyl group bonds. In the case of hexamethyldisilazane, there are two silicon atoms bonded to one reactive group, the central amine nitrogen. But after reaction with surface hydroxyl groups, the attached silicon atoms are bonded to three methyl groups in addition, of course, to their bond to the surface.

In this invention, the silicon compound has three reactive groups for each silicon atom in the molecule. One or two of these reactive groups may be consumed by a surface reaction but the attached silicon atom will have at least one or more reactive groups remaining. The remaining reactive group or groups can interact with the titanium or magnesium component of the catalyst. By such interaction, the polymerization reactions can be influenced toward desirable properties in the polymer products. The catalysts of this invention consequently have an advantage of adaptability to specific requirements by means of selecting the appropriate multifunctional silane compound.

The multifunctional silicon compound or silane has the following structural formula:

$$RSiX_3$$

where X is a group chemically reactive with the hydroxyl groups of the silica or alumina, or reactive with the titanium or magnesium component of the catalyst. The invention requires three such reactive groups, and they may be the same or different. Examples of X reactive groups are —Cl, $(OR^1)$, —$N(R^1)_2$, —$N(H)Si(R^1)_3$, —$OCH_2CH_2OR^1$ and —$O_2CR^1$.

The R or $R^1$ group is a hydrocarbon group or hydrocarbon derivative group preferably but not necessarily having one to about 10 carbon atoms such as alkyl, phenyl or an alkyl group with a substituent such as chloride or amino groups. The silicas or-aluminas that are suitable for this invention may contain minor amounts of zirconia, magnesia, or titania. For catalyst manufacture, it is preferred to have relatively finely divided silica or alumina, which may be porous or nonporous.

Prior to reaction with the multifunctional silane, the silica or alumina may be dried to completely remove surface water at a temperature less than 800° C. The drying may instead be only partial in some cases in order to leave a small amount of water, or the drying can be eliminated entirely. Usually, it is preferred to at least partially remove the surface water from the silica or alumina.

The Group IVB and Group VB transition metals that are especially useful in this invention include titanium, zirconium and vanadium.

The preferred titanium compound may be selected from the following formulas:

$$TiX_4^1$$
$$TiX_m^1(OR^2)_{(4-m)}$$

in which m is 0, 1, 2, 3 or 4. $R^2$ is selected from alkyl, aryl, cycloalkyl, alkaryl, cyclopentadienyl and alkenyl, for example, ethenyl, propenyl and isopropenyl, each of these groups having 1 to 12 carbon atoms, and $X^1$ is halogen. When more than one $R^2$ group occurs in the titanium compound, the groups can be the same or different. The halides and haloalkoxides of titanium are preferred.

The amount of multifunctional silane compound may be in excess of the reactive groups of silica or alumina surface. When this is the case, the conversion of the surface groups can be made as complete as possible. The unreacted excess of multifunctional silica can be removed by distillation at less than 200° C. at decreased pressure if necessary, or by heat and inert gas purging. The reaction product of the silica or alumina with the multifunctional silane should not be heated above 300° C., which might lead to thermal decomposition of the bonded silane groups.

The amount of multifunctional silane compound may also be less than the stoichiometric equivalent of the reactive groups upon the silica or alumina. In this case, all of the silane compound may become attached to the surface so that no removal of excess is necessary.

If the catalyst is made with a titanium compound which is not a halide, an alkyl aluminum halide can be added to supply halide and increase reactivity. However, titanium tetrachloride is a preferred compound. The titanium compound is normally added to the treated silica or alumina before the magnesium compound, but the titanium compound can also be added after the magnesium compound. The amount of titanium compound is preferably less than the amount equivalent to the surface reactive groups. Nonetheless, this invention includes amounts of titanium compound, which are from 1 to 200 percent of that equivalent amount.

The Group IIA organometallic compounds that are especially useful in this invention are the alkyls and aryls of magnesium and calcium. The alkyl groups may contain about 1 to 13 carbon atoms.

The organomagnesium compounds of this invention include the following types:

$$R^3R^3Mg,$$
$$(R^3R^4Mg)_a(R_3Al)$$
$$R^3MgCl$$

in which $R^3$ and $R^4$ are alkyl groups, branched or straight chained, and identical or different. a is an integer of 1–10. The magnesium alkyls may contain small amounts of ether or aluminum alkoxide to increase its solubility. These compounds are normally dissolved in hydrocarbons such as hexane or heptane.

The amount of organomagnesium compound added to make the catalysts of this invention is determined by the amount of titanium compound. Normally, the Mg/Ti ratio is from 0.1 to 5 and 0.5–1.5 is preferred.

Following the reaction, it is necessary to remove the excess solvent in order to have a free-flowing catalyst. The solvent removal prevents reactor fouling in the case of the particle form polymerization process, and increases the bulk density of the product. Evaporation in an atmosphere of flowing inert gas is the preferred method of solvent removal, although filtration, centrifuging, or decantation can also be practiced.

The alkyl aluminum cocatalyst can be chosen from trialkyl aluminum compounds and alkyl aluminum hydride compounds and their mixtures. The alkyl groups of suitable cocatalysts have hydrocarbon chains containing one to about ten carbon atoms and may be straight chained or branched. Triaryl aluminum compounds may also be used but because they are not so readily obtained as the alkyl compounds they are not preferred. Examples of suitable cocatalysts are triethylaluminum, trioctyl aluminum, tri(2-methyl pentyl)aluminum and diethyl aluminum hydride. Triisobutyl aluminum and diisobutylaluminum hydride are especially preferred. If needed, alkyl aluminum halides may be used along with the alkyl aluminum compounds described above.

The cocatalyst may be fed to the polymerization reactor along with the above-described solid component in the same or preferably separate lines. The molar ratio of the cocatalyst to the Group IVB and VB transition metal compounds solid component can be from 0.1:1 to 100:1 although the preferred range is 1:1 to 20:1.

When using the catalyst according to the invention, at least one 1-olefin of the formula $R^6$—CH=$CH_2$, where $R^6$ is hydrogen or a straight chain or branched alkyl radical having from 1 to 10, preferably from 1 to 8, carbon atoms is polymerized. Examples of such olefins are ethylene, propylene, butene-1, hexene-1, 4-methyl-pentene-l, octene-1. Mixtures of 1-olefins of the above formula containing about 70 wt % of ethylene may be used.

The polymerization may be carried out in suspension, solution or in the gaseous phase, continuously or discontinuously, at a temperature of from 20°–300° C., preferably from 60–°110° C., under a pressure of from atmospheric to 10,000 psi. It is carried out preferably under the technically interesting pressure in the range of from 300–800 psi.

The melt index of the polyethylene produced by the invention catalyst can be controlled by methods known to the art such as by increasing the temperature of polymerization or by the addition of hydrogen. These catalysts show relatively high activity in ethylene polymerization and copolymerization. The polymers can be easily blended with antioxidants and pelletized for commercial use. High partial pressure of hydrogen can be used to yield very high melt index products.

The catalysts are useful for producing polymers of 1-olefins of 2 to 8 carbon atoms and copolymers of these with 1-olefins of 2 to 20 carbon atoms to form solid polymers or copolymers.

EXAMPLES

Example 1

An 8.0 g quantity of Davison Chemical grade 952 silica was dried in a nitrogen-fluidized bed for 2 hours at 200° C. The temperature was decreased to 90° C., and 2.33 ml of 3-aminopropyltriethoxysilane was added by syringe and long needle. The 90° C. temperature was held for 16 hours. The 2.33 ml quantity of 3-aminopropyltriethoxysilane amounts to 1.25 mmol/g of silica.

Without exposure to atmospheric contamination, 1.9 g of this treated silica was introduced to a reaction flask. The reaction flask had been oven-dried at 130° C. and cooled to room temperature with a nitrogen flow passing through it. During the preparation of the catalyst the flow of nitrogen was maintained continuously. A 20 ml volume of hexane was added, then 0.26 ml of titanium tetrachloride. The color became dark orange. The reaction mixture was stirred for 30 minutes at room temperature, then 5.6 ml of a dibutyl magnesium-triethylaluminum complex solution was added. The complex had a Mg/Al ratio of 6.1 and was dissolved in heptane. Subsequently, the mixture was stirred for an additional 30 minutes at room temperature. The solvents were evaporated by submerging the reaction flask in a 90° C. oil bath. When the evaporation was complete, a black powder remained.

In this preparation, the amount of titanium tetrachloride was 1.25 mmol/g of silica, and the Mg/Ti atomic ratio was 1.0.

The catalyst was tested in a polymerization reaction in the following way. A quantity of the catalyst was transferred to a polymerization reactor maintained at 215° F. A volume of 25% triisobutylaluminum solution in heptane was added by syringe. The amount of triisobutylaluminum was 9.2 mmols per gram of catalyst, to give a triisobutylaluminum (TIBAL) to titanium molar ratio of 10.5. A 500 ml volume of isobutane was pressured into the polymerization vessel after it was closed. Hydrogen to give a 100 psi increase in pressure was added, and then ethylene was added to maintain a constant pressure of 550 psi. The reaction was continued for one hour. The yield of particle form polyethylene was 2550 g/g of catalyst. It had a melt index of 5.7, and a ratio of high load melt index to melt index of 29.

Example 2

An 8.0 g quantity of Davison grade 952 silica was dried as described in Example 1. At 100° C., 0.47 ml of 3-aminopropyltriethoxysilane was added to the fluidized bed. The temperature was held for 2 hours. The amount of 3-aminopropyltriethoxysilane was 0.25 mmol/g of silica.

A catalyst was made with this silica and tested as described in Example 1. The reactivity was 1645 g/g of catalyst per hour and the melt index was 2.75.

Example 3

An 8.0 g quantity of Davison 952 silica was dried at 200° C. for 2 hours in a fluidized bed with $N_2$ flow. The temperature was decreased to 100° C., and 1.85 ml of 3-chloropropyltrimethoxysilane was added to the fluidized bed. The temperature and fluidization were maintained for an additional 2 hours.

A catalyst was made from this silica as described in Example 1. It was dark brown and free-flowing. A polymerization test as in Example 1 gave a reactivity of 3760 g/g catalyst per hour and a melt index of 4.93.

Example 4

This example shows that a different order of addition can be used for making the catalyst of this invention. In this example, the organomagnesium compound was added before the titanium compound.

An 8.0 g quantity of Davison grade 952 silica was dried as in Example 1. With the temperature of the fluidized bed at 100° C., 2.5 ml of n-dodecyltrichlorosilane was injected into the bed by means of a syringe and long needle. The temperature of the bed was adjusted to 110° C., and this temperature was maintained for 16 hours. The amount of n-dodecyltrichlorosilane was 1.25 mmol/g of silica.

A catalyst was prepared from this treated silica as described in Example 1 except that the dibutylmagnesium-triethylaluminum complex solution was added to the treated silica prior to the titanium tetrachloride.

A polymerization test was conducted as in Example 1. The reactivity of this catalyst was shown to be 1692 g/g catalyst per hour. The melt index of the polyethylene was 3.5, and the ratio of high load melt index to melt index was 24.

Example 5

This example illustrates the use of an excess of multifunctional silane, and also the use of a different titanium compound.

A 10 g quantity of Davison grade 952 silica was heated in a nitrogen-fluidized bed for 2 hours at 300° C. The diameter of the fluidized bed was one inch and the nitrogen flow rate 300 ml/minute.

At a temperature of 200° C., 14.3 g of dodecyltrichlorosilane was added. This amount of the silane compound was not completely absorbed by the silica, and the bed was flooded for a few minutes. The temperature and nitrogen flow were maintained for one hour. At this stage, the treated silica was free-flowing. The amount of n-dodecyltrichlorosilane was 4.7 mmol/g of silica.

A catalyst was made from this treated silica in a flask purged with nitrogen. The total amount of the treated silica was transferred to the flask. A 7.5 ml volume of 25% ethyl aluminum sesquichloride in heptane was added, followed immediately by 6.5 ml of 10% butyl ethyl magnesium in heptane and 0.4 ml of titanium tetraisopropoxide. The solvents were evaporated by heating the flask in a 90° C bath while sweeping with nitrogen.

The catalyst was tested as described in Example 1 except that the temperature of polymerization was 221° F., the ratio of triisobutylaluminum cocatalyst to catalyst was 1.8 mmol/g, and the $H_2$ was 50 psi. The reactivity of the catalyst was found to be 1079 g/g catalyst per hour. The reactivity calculated on the titanium was 206,000 g/g Ti per hour.

Example 6

This example shows that a modification in polymer properties results from the use of a multifunctional silane in place of a monofunctional silane compound in the catalyst preparation.

A catalyst, prepared with 3-aminopropyltriethoxy silane as described in Example 1, was tested for the particle form polymerization of ethylene in a 2 liter reaction vessel instead of the 1.4 liter reaction vessel previously used. The temperature of the polymerization was 215° F., and 100 psi hydrogen was added. In the larger vessel, the 100 psi is a larger quantity of hydrogen than the same pressure in the smaller vessel. TIBAL was used as the cocatalyst as before.

A catalyst was made in a similar manner, but with a monofunctional silane, hexamethyldisilazane in place of the 3-aminopropyltriethoxy silane. This catalyst was tested in the 2 liter reaction vessel with conditions identical to those in the test of the first catalyst. The results of these two tests are given below:

|  | Reactivity g/g cat/hr | Melt Index |
| --- | --- | --- |
| Invention Catalyst with 3-aminopropyl-triethoxysilane | 1678 | 22 |
| Comparison Catalyst with hexamethyldi-silazane | 2229 | 12.4 |

It can be seen that the catalyst of this invention gave a melt index twice as great as the comparison catalyst.

Example 7

The catalyst of Example 3 made with 3-chloropropyltrimethoxy silane was tested as described in Example 6. It gave the following result.

| Reactivity g/g cat/hr | Melt Index |
| --- | --- |
| 2834 | 25.6 |

The melt index with this invention catalyst is also higher than obtained with the monofunctional compound hexamethyldisilazane.

We claim:

1. The method of making polymers from polymerizable 1-olefins which comprises polymerizing at least one of said 1-olefins under polymerizing conditions with a catalyst system comprising an alkyl or aryl aluminum compound cocatalyst and a solid catalyst prepared by:
   (1) reacting a multifunctional organic silicon compound of the formula $RSiX_3$, with silica or alumina or a mixture thereof having surface hydroxyl groups, where R is a hydrocarbon group or hydrocarbon derivative group and X is a group chemically reactive with said surface hydroxyl groups selected from the group consisting of $-OR^1$, $-N(R^1)_2$, $-N(H)SiR_3^1$, $-OCH_2CH_2OR^1$, $-O_2CR^1$, or mixtures, where $R^1$ is a hydrocarbon group or hydrocarbon derivative group;
   (2) reacting the product of step (1) with a halide or alkoxide of titanium, vanadium or zirconium or mixture of these; and
   (3) reacting the product of step (2) with an organomagnesium compound or complex; or
   (2') reacting the product of step (1) with an organomagnesium compound or complex; and
   (3') reacting the product of step (2') with a halide or alkoxide of titanium, vanadium or zirconium or mixture of these.

2. The method of claim 1 wherein R is an alkyl group or derivative.

3. The method of claim 1 wherein the molar ratio of said cocatalyst to said halide or alkoxide of step (2) or step (3') in the catalyst is about 0.1-100:1.

4. The method of claim 1 wherein the molar ratio of said cocatalyst to said halide or alkoxide of step (2) or step (3') in the catalyst is about 1-20:1.

5. The method of claim 1 wherein the organomagnesium compounds of step (3) or step (2') are alkyl derivatives of magnesium of about 1 to 18 carbon atoms and aryl derivatives of magnesium.

6. The method of claim 1 wherein said catalyst has a ratio of magnesium to titanium, vanadium or zirconium of between about 0.1 and 5.

7. The method of claim 1 wherein said catalyst has a ratio of magnesium to titanium, vanadium or zirconium of between about 0.5 to 1.5.

8. The method of claim 1 wherein said silica or alumina or mixture are dried to remove surface water.

9. The method of claim 1 wherein said halide or alkoxide of step (2) or step (3') is $TiX^1$ or $Tix_3^1(OR^2)_{4-m}$, in which $X^1$ is halogen, $R^2$ is alkyl or aryl of 1 to about 12 carbon atoms and m is 0, 1, 2, 3 or 4.

10. The method of claim 1 wherein said organomagnesium compound is:

$R^3R^3Mg$,
$(R^3R^4Mg)_a(R_3Al)$
$R^3MgCl$, in which $R^3$ and $R^4$ are alkyl groups, branched or straight chained, and identical or different and a is an integer of from 1-10.

11. The method of claim 1 wherein said cocatalyst is a trialkyl aluminum compound or an alkyl aluminum hydride compound, or a mixture.

12. The method of claim 11 wherein each said alkyl is a hydrocarbon chain of about 1-10 carbon atoms.

13. The method of claim 1 wherein said reaction of step (1) is with silica which has been predried at about 100°-200° C. for a time sufficient to remove surface water prior to said reaction.

14. The method of claim 1 wherein said organic silicon compound in step (1) is in stoichiometric excess thereby facilitating a complete reaction, and said excess is later removed.

15. The method of claim 1 wherein the product of (1) is separated from any unreacted organic silicon compound and reaction by-products.

16. The method of claim 1 wherein said separation is at a temperature between ambient and 200° C.

17. The method of claim 1 wherein said cocatalyst is an alkyl aluminum and the alkyl groups comprise hydrocarbon chains that are straight or branched and each chain contains about 1 to 10 carbon atoms.

18. The method of claim 1 wherein said cocatalyst comprises an aryl aluminum compound.

19. The method of claim 1 wherein said 1-olefin consists essentially of ethylene.

20. The method of claim 1 wherein said 1-olefin consists essentially of ethylene and another 1-olefin which are copolymerized to produce medium and low density copolymers.

21. The method of claim 1 wherein said 1-olefin is of the formula $R^6$—CH=CH$_2$ wherein $R^6$ is hydrogen or alkyl having 1–10 carbon atoms.

22. The method of claim 1 wherein said polymerization is at a temperature of from about 20°–150° C. at a pressure of between about 100 and 1000 psi.

23. The method of claim 1 wherein said polymerization is at a temperature of from about 60°–110° C. at a pressure of between about 100 and 1000 psi.

24. The method of claim 1 wherein said polymerization is at a temperature of from about 60°–110° C. at a pressure of between about 300 and 800 psi.

25. The method of claim 1 wherein the halide or alkoxide of step (2) or step (3') comprises a titanium halide or alkoxide.

26. The method of claim 1 wherein said organic silicon compound comprises 3-aminopropyl triethoxysilane.

27. The method of claim 1 wherein said organic silicon compound comprises 3-chloropropyl trimethoxysilane 28. The method of claim 21 wherein said 1-olefin is a mixture containing about 70 wt. % ethylene.

29. The method of claim 1 wherein R has one to about 10 carbon atoms.

30. The method of claim 1 wherein $R^1$ has one to about 10 carbon atoms.

* * * * *